(12) United States Patent
King

(10) Patent No.: US 6,425,510 B1
(45) Date of Patent: Jul. 30, 2002

(54) ATV STORAGE BOX APPARATUS

(76) Inventor: Terry Wayne King, 201 Franklin St., Cowan, TN (US) 37318

( * ) Notice: Subject to any disclaimer, the term of this patent is extended or adjusted under 35 U.S.C. 154(b) by 0 days.

(21) Appl. No.: 09/609,980

(22) Filed: Jul. 5, 2000

Related U.S. Application Data

(60) Provisional application No. 60/143,497, filed on Jul. 9, 1999.

(51) Int. Cl.⁷ .................................................. B60R 7/00
(52) U.S. Cl. ........................ 224/401; 224/410; 224/431; 224/435; 224/440; 224/446; 224/42.38; 296/37.1; D12/423
(58) Field of Search ................................ 224/401, 410, 224/419, 431, 433, 435, 440, 446, 448, 451, 452, 454, 462, 42.38; 296/37.1; D12/423

(56) References Cited

U.S. PATENT DOCUMENTS

| | | | |
|---|---|---|---|
| 3,687,344 A | * | 8/1972 | Nixon ..................... 224/401 X |
| 4,247,030 A | | 1/1981 | Amacker |
| 4,300,706 A | | 11/1981 | Hendrick et al. |
| 4,844,309 A | * | 7/1989 | Aubin et al. ................. 224/273 |
| 5,236,062 A | * | 8/1993 | Laney ......................... 182/127 |
| 5,573,162 A | | 11/1996 | Spencer et al. |
| 5,642,844 A | | 7/1997 | Rector |
| 5,706,990 A | | 1/1998 | Lahrson |
| D417,647 S | * | 12/1999 | Jardine ....................... D12/423 |
| 6,209,941 B1 | * | 4/2001 | Cross ......................... 296/37.1 |

* cited by examiner

Primary Examiner—Stephen K. Cronin
(74) Attorney, Agent, or Firm—Henderson & Sturm LLP

(57) ABSTRACT

A storage box apparatus (10) for use in combination with the rear rack (13) of an ATV (11) for transporting tree stands (15) and other hunting accessories and equipment to a remote location. The apparatus (10) includes a storage box unit (12) having a front portion attached to the rear rack (13) of the ATV (11) such that the rear portion of the storage box unit (12) is suspended in cantilever fashion from the rear of the ATV (11). The rear portion of the storage box unit (12) is provided with an article carry channel (22) and a carry channel cover (24) having at least one elongated support leg (26) slidably disposed in the rear portion of the storage box unit (12) for accommodating tree stands (15) having different dimensions.

18 Claims, 3 Drawing Sheets

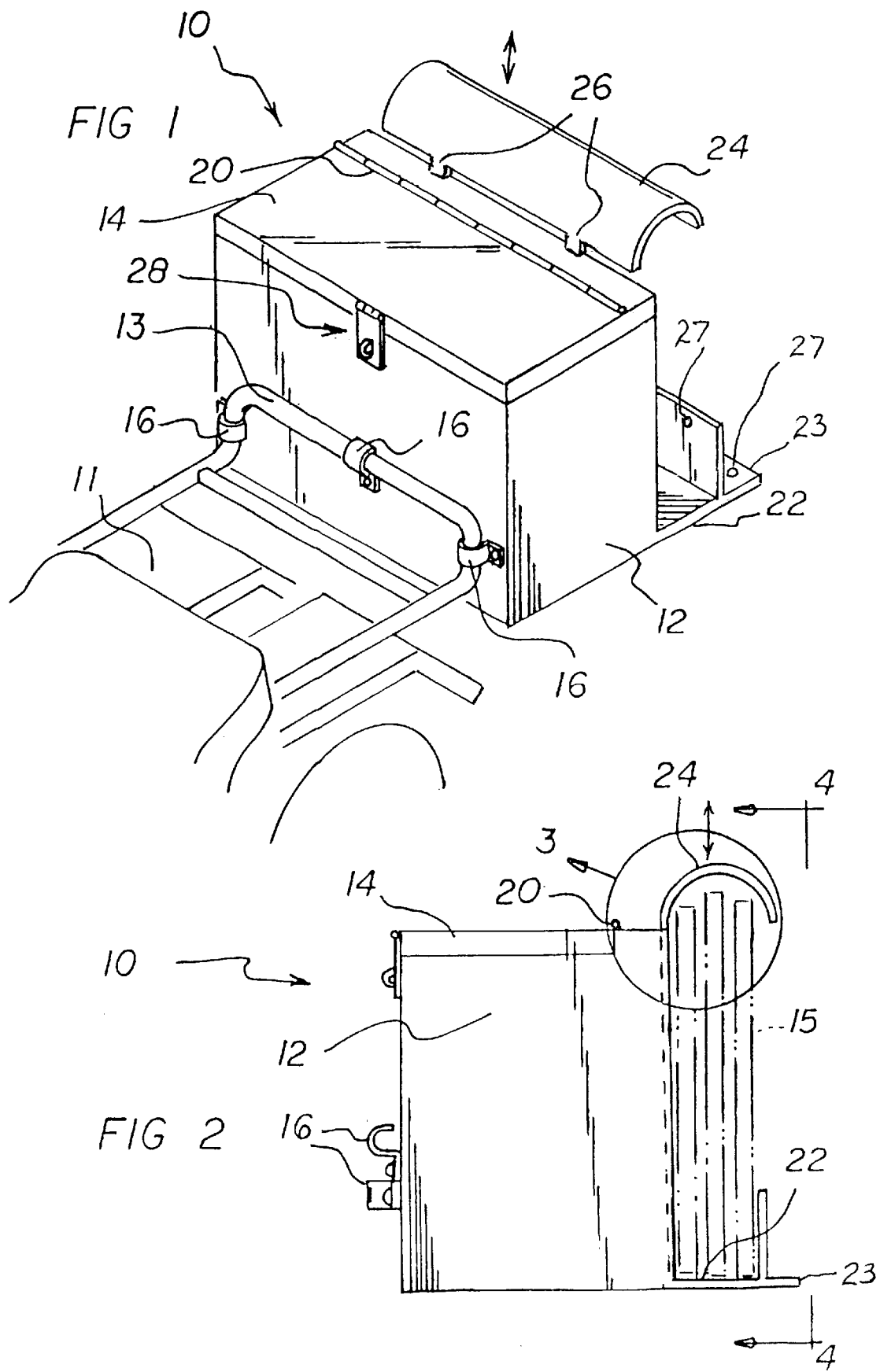

ATV STORAGE BOX APPARATUS

CROSS REFERENCE TO RELATED APPLICATIONS

This application contains disclosure from and claims the benefit under Title 35 United States Code §119(e) of United States Provisional Application Ser. No. 60/143,497 filed Jul. 9, 1999 entitled "ATV Storage Box Apparatus", which provisional application is incorporated herein by reference.

BACKGROUND OF THE INVENTION

1. Field of the Invention

The present invention relates to the field of storage accessories for ATV's in general, and in particular to a cantilevered storage box apparatus that is provided with means for transporting tree stands having different dimensions.

BRIEF SUMMARY OF THE INVENTION

A storage box apparatus is provided for an all terrain vehicle (ATV) and includes a storage box unit which includes a box lid. Vehicle attachment brackets are connected to the storage box unit for attaching the storage box unit to the ATV. An article carry channel extends outward from a bottom portion of the storage box unit, and a carry channel cover is attached to a top portion of the storage box unit. The article carry channel is U-shaped. The storage box unit defines an internal storage chamber. The box lid is connected to the storage box unit by a lid hinge. The box lid rotates around the lid hinge such that the storage chamber is accessible from a driver of the ATV while seated on a driver's seat. The vehicle attachment brackets are generally U-shaped for engaging a generally tubular shaped rearmost portion of the rack of the ATV. A lid lock assembly is provided for locking the box lid in a closed orientation. The vehicle attachment brackets are connected to a rear portion of an ATV rack, such that the storage box unit extends behind the ATV when it is connected to the ATV.

The carry channel cover is slidably connected to the rear of the storage box unit by a tongue and groove arrangement and biased into a closed position by a plurality of bungee cords which engage a plurality of apertures formed on the article carry channel.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing a preferred embodiment of the ATV storage box apparatus of the invention attached to the rear of a rack on an ATV;

FIG. 2 is a side view of the embodiment of the ATV storage box apparatus shown in FIG. 1 removed from the rack on the ATV;

DETAILED DESCRIPTION OF THE INVENTION

Figure 3:
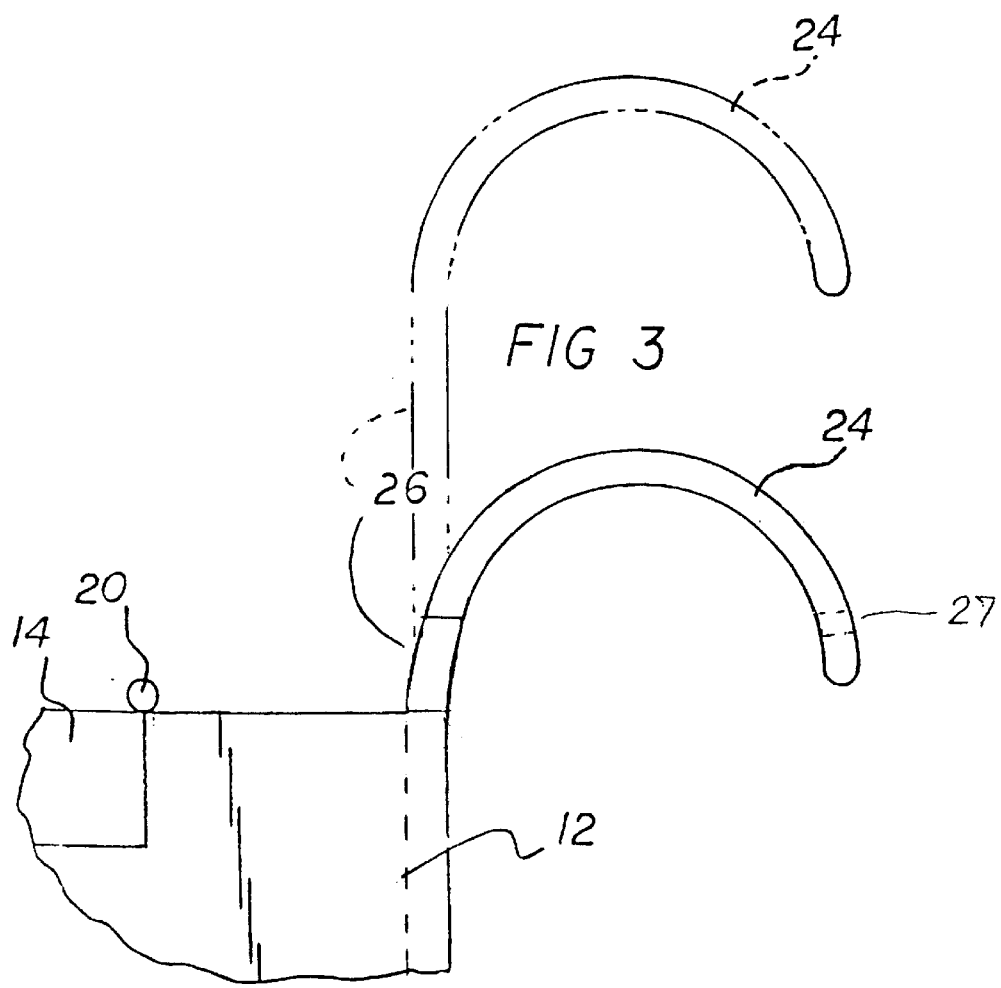
FIG. 3 is a side view of an enlarged to portion of the ATV storage box apparatus wherein the carry cover for the carry channel is shown in both raised and lowered orientations.

With reference to the drawings, a new and improved ATV storage box apparatus embodying the principles and concepts of the present invention will be described.

Turning to FIGS. 1–6, there is shown an exemplary embodiment of the ATV storage box apparatus of the invention generally designated by reference numeral 10. In its preferred from, ATV storage box apparatus 10 is provided for an all terrain vehicle 11 and includes a storage box unit 12 which includes a box lid 14. Vehicle attachment brackets 16 are connected to the storage box unit 12 for attaching the storage box unit 12 to the ATV 11. An article carry channel 22 extends outward from a bottom portion of the storage box unit 12, and a carry channel cover 24 is slidably attached to the rear portion of the storage box unit 12 by a pair of support legs 26. The article carry channel 22 is generally U-shaped and is provided with an outwardly projecting lip 23. The storage box unit 12 defines an internal storage chamber 18. The box lid 14 is connected to the storage box unit 12 by a lid hinge 20. The box lid 14 rotates around the lid hinge 20 such that the storage chamber 18 is accessible from a driver of the ATV 11 while seated on a driver's seat. The vehicle attachment brackets 16 are generally U-shaped for engaging a generally tubular shaped rearmost portion of the rack 13 of the ATV 11. A lid lock assembly 28 is provided for locking the box lid 14 in a closed orientation. The vehicle attachment brackets 16 are connected to a rear portion of an ATV rack 13, such that the storage box unit 12 extends behind the ATV 11 when it is connected to the ATV 11.

The vehicle attachment brackets 16 are connected to the storage box unit 12 with conventional bolts, screws, or other suitable fasteners. The generally U-shaped carry channel cover 24 is slidably connected to the rear portion of the storage box unit 12 by a pair of elongated support legs 26 which are slidably received in a pair of suitably dimensioned slots formed in the rear portion of the storage box unit 12.

Figure 4:
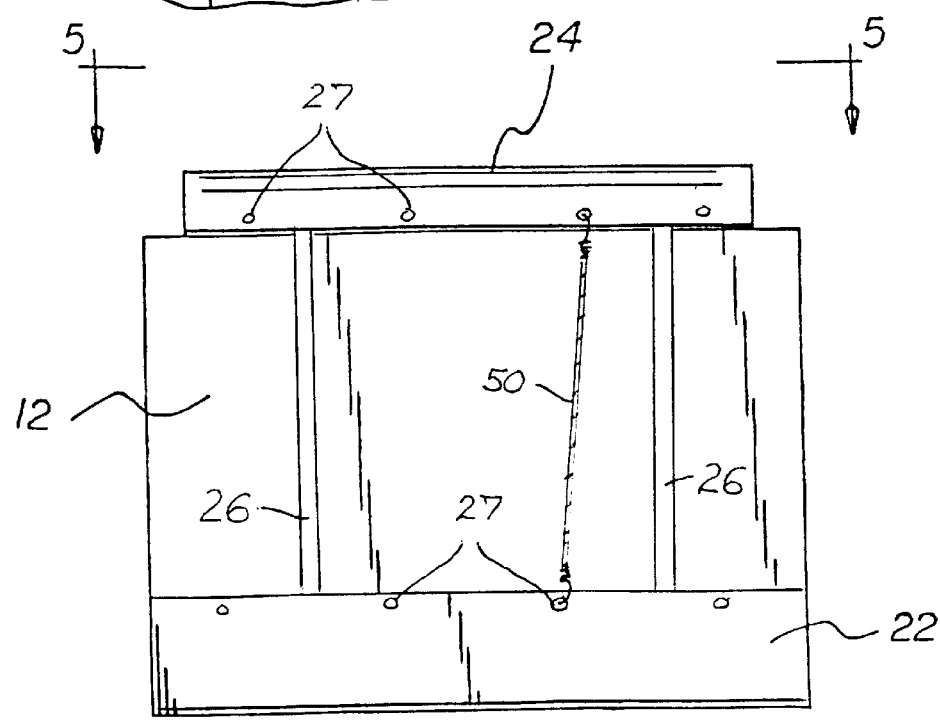
FIG. 4 is a rear view of the embodiment of the invention shown in FIG. 2 taken along line 4—4 thereof.
Figure 5:
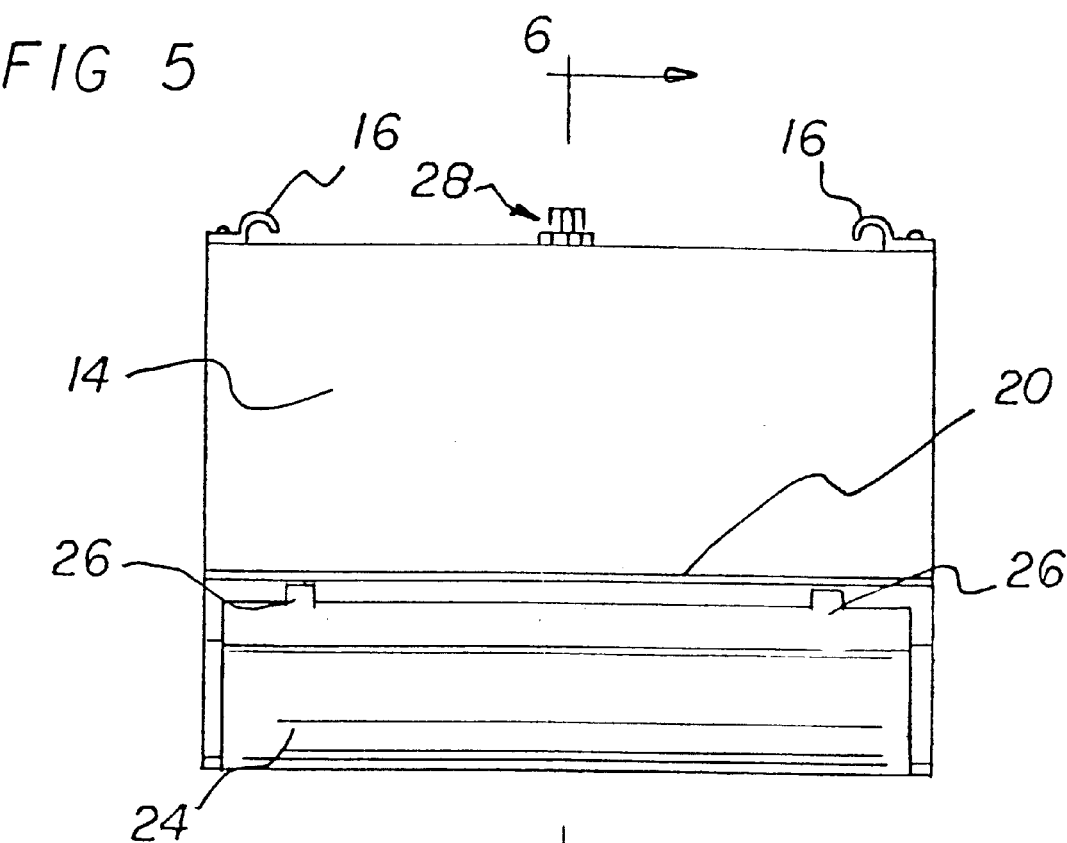
FIG. 5 is a top view of the embodiment of the invention shown in FIG. 4 taken along line 5—5 thereof.
Figure 6:
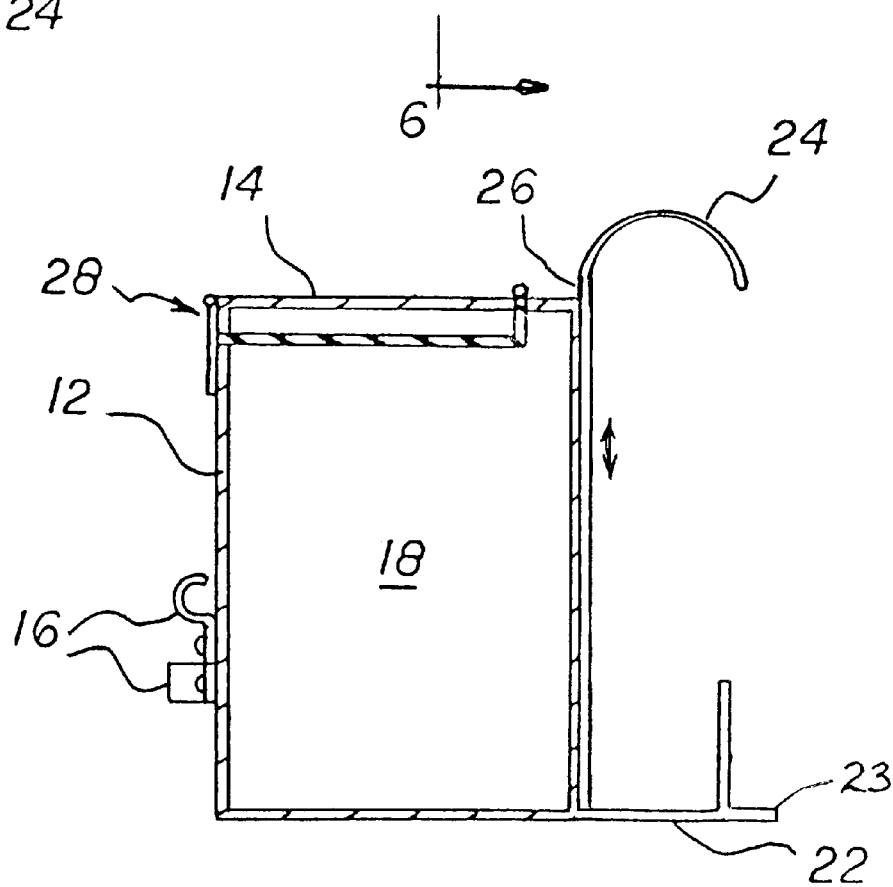
FIG. 6 is a cross sectional view of the embodiment of the invention shown in FIG. 5 taken along line 6—6 thereof.

In addition, as shown in FIGS. 1 and 4, both the channel cover 24, as well as the carry channel 22 and the rearwardly extending carry channel lip 23 are provided with a plurality of discrete apertures 27 which are dimensioned to receive the opposite ends of conventional resilient fasteners 50 such as bungee cords or the like, for biasing the channel cover 24 towards the carry channel 22.

As shown in FIG. 1; the vehicle attachment brackets 16 are attached to the tubular rack 13 of the ATV 11. More specifically, the vehicle attachment brackets 16 are attached to the rearmost vertically extending portion of the rack 13.

As shown in FIG. 2, the article carry channel 22 can be used for carrying folding tree stands 15 having different dimensions. With the carry channel cover 24 in the closed position, and being urged closed by resilient bungee cords 50, the tree stand 15 is prevented from falling out from the article carry channel 22 during movement of the ATV 11 over rugged terrain. To remove the tree stand 15 from the article carry channel 22, as shown with the solid lines in FIG. 3, the bungee cords 50 are removed and the carry channel cover 24 is lifted. When the tree stands 15 are removed from the article carry channel 22, the carry channel cover 24 will return to the closed position by virtue of gravity.

Since the storage box apparatus 10 extends outward behind the rack 13 of the ATV 11, the storage box apparatus 10 performs an additional function. If the ATV 11 is tilted backward, the ATV 11 is prevented from flipping over backward and overturning by the bottom surfaces of the article carry channel 22, the carry channel lip, and the storage box unit 12.

The components of the ATV storage box apparatus of the invention can be made from inexpensive and durable metal and plastic materials.

The foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described above may be resorted to in carrying out the present invention.

I claim:

1. A storage box apparatus for use in combination with an ATV equipped with a rear rack wherein the storage box apparatus comprises:
    a storage box unit having a front portion and a rear portion wherein the front portion of the storage box unit is secured to the rear of the rack of the ATV such that the rear portion of the storage box unit projects rearwardly from the ATV in a cantilevered fashion;
    an article carry channel extending rearwardly from the lower end of the rear portion of the storage box unit; and a carry channel cover operatively connected to the rear portion of the storage box unit wherein said carry channel cover is movable relative to said article carry channel.

2. The apparatus as in claim 1 wherein said carry channel cover is movable relative to said article carry channel.

3. The apparatus as in claim 1 wherein said carry channel cover is spaced from and vertically displaceable relative to said article carry channel.

4. The apparatus as in claim 1 further including biasing means releasably associated with the carry channel cover and the article carry channel for urging the carry channel cover in the direction of the article carry channel.

5. The apparatus as in claim 1 wherein both the article carry channel and the carry channel cover are provided with a plurality of spaced discrete apertures dimensioned to receive the opposite ends of at least one fastening element.

6. The apparatus as in claim 1 wherein the article carry channel is further provided with a rearwardly projecting carry channel lip.

7. The apparatus as in claim 6 wherein at least the carry channel lip and the carry channel cover are provided with a plurality of spaced discrete apertures dimensioned to receive the opposite ends of at least one fastening element.

8. The apparatus as in claim 6 wherein the carry channel cover, the article carry channel, and the carry channel lip are provided with a plurality of spaced discrete apertures.

9. The apparatus as in claim 8 further including: at least one fastening element having a first end and a second end wherein said first end is received in one of the plurality of apertures in the carry channel cover and the second end is selectively received in one of the plurality of spaced apertures among the article carry channel and the carry channel lip.

10. The apparatus as in claim 1 wherein the storage box unit is further provided with a top portion having a box lid.

11. The apparatus as in claim 10 wherein the box lid is hingedly connected to the top portion of the storage box unit.

12. The apparatus as in claim 11 wherein the box lid is provided with a lid lock assembly.

13. The apparatus as in claim 12 wherein the front portion of the storage box unit is provided with a plurality of vehicle attachment brackets which are adapted to engage the rear portion of the rear rack of the ATV.

14. A storage box apparatus for use in combination with an ATV equipped with a rear rack wherein the storage box apparatus comprises:
    a storage box unit having a front portion and a rear portion wherein the front portion of the storage box unit is secured to the rear of the rack of the ATV such that the rear portion of the storage box unit projects rearwardly from the ATV in a cantilevered fashion;
    an article carry channel extending rearwardly from the lower end of the rear portion of the storage box unit; and
    a carry channel cover operatively connected to the rear portion of the storage box unit, wherein both the article carry channel and the carry channel cover are provided with a plurality of spaced discrete apertures dimensioned to receive the opposite ends of at least one fastening element.

15. A storage box apparatus for use in combination with an ATV equipped with a rear rack wherein the storage box apparatus comprises:
    a storage box unit having a front portion and a rear portion wherein the front portion of the storage box unit is secured to the rear of the rack of the ATV such that the rear portion of the storage box unit projects rearwardly from the ATV in a cantilevered fashion;
    an article carry channel extending rearwardly from the lower end of the rear portion of the storage box unit; and a carry channel cover operatively connected to the rear portion of the storage box unit, wherein the article carry channel is further provided with a rearwardly projecting carry channel lip.

16. The apparatus as in claim 15 wherein at least the carry channel lip and the carry channel cover are provided with a plurality of spaced discrete apertures dimensioned to receive the opposite ends of at least one fastening element.

17. The apparatus as in claim 16 wherein the carry channel cover, the article carry channel, and the carry channel lip are provided with a plurality of spaced discrete apertures.

18. The apparatus as in claim 17 further including: at least one fastening element having a first end and a second end wherein said first end is received in one of the plurality of apertures in the carry channel cover and the second end is selectively received in one of the plurality of spaced apertures among the article carry channel and the carry channel lip.

* * * * *